United States Patent [19]

Adachi

[11] Patent Number: 5,992,487
[45] Date of Patent: Nov. 30, 1999

[54] PNEUMATIC TIRE WITH DOUBLE LAYER SIDEWALL

[75] Inventor: Yukishige Adachi, Toyota, Japan

[73] Assignee: Sumitomo Rubber Industries, Ltd., Hyogo-ken, Japan

[21] Appl. No.: 08/908,384

[22] Filed: Aug. 7, 1997

[51] Int. Cl.[6] ............................ B60C 13/00; B29D 30/72
[52] U.S. Cl. ...................... 152/524; 152/525; 156/123; 156/130.7
[58] Field of Search ................................ 152/524, 525; 156/116, 130.7, 123

[56] References Cited

U.S. PATENT DOCUMENTS

| | | | |
|---|---|---|---|
| 5,036,132 | 7/1991 | Coran | 525/236 |
| 5,267,595 | 12/1993 | Lampe | 152/525 |
| 5,388,627 | 2/1995 | Nakada | 152/525 |
| 5,628,956 | 5/1997 | Theusner et al. | 264/438 |
| 5,714,022 | 2/1998 | Nagao et al. | 152/525 |

*Primary Examiner*—Geoffrey L. Knable

[57] ABSTRACT

A pneumatic tire comprises a carcass extending between bead portions through a tread portion and a pair of sidewall portions, and a sidewall rubber disposed axially outside the carcass in each sidewall portion, the sidewall rubber comprising an axially outer layer and and an axially inner layer, the outer layer disposed along the outside of the tire and containing powder rubber, the inner layer disposed along the axially inside of the outer layer and containing no powder rubber, the thickness of the outer layer being 3 to 50% of the total thickness of the sidewall rubber, and the outer layer composed of 100 parts by weight of a base rubber compound and 5 to 20 parts by weight of the powder rubber. The powder rubber has a maximum particle diameter of 30 to 80 meshes.

8 Claims, 4 Drawing Sheets

PNEUMATIC TIRE WITH DOUBLE LAYER SIDEWALL

BACKGROUND OF THE INVENTION

The present invention relates to a pneumatic tire, more particularly to an improved sidewall.

In general, as shown in FIG. 4, a sidewall rubber (d) disposed in the sidewall portion (b) of a pneumatic tire (a) is formed by applying a raw sidewall rubber portion (da) on the outside of a carcass (c). Then, the assembled raw tire is put in a vulcanizing mold.

The raw sidewall rubber portion (da) is typically wound in a roll (r) as shown in FIG. 5, with a separator (f), (e.g. a polyethylene film disposed between the windings to prevent their adhesion).

Accordingly, before applying the raw sidewall rubber (da) on the carcass (c), the separator (f) must be removed, which decreases production efficiency.

Further, because the outside of the raw sidewall rubber in the raw tire is adhesive, when putting the raw tire in the mold, the outside is liable to adhere to the inside of the mold irregularly. Thus air-filled spaces are liable to form. Such spaces result in blemishes the outside of the finished tire.

SUMMARY OF THE INVENTION

It is therefore an object of the present invention to provide a pneumatic tire in which production efficiency is improved, and the occurrence of blemishes in the sidewall portion is prevented.

According to one aspect of the present invention, a pneumatic tire comprises
- a carcass extending between bead portions through a tread portion and a pair of sidewall portions, and
- a sidewall portion disposed axially outside the carcass in each sidewall portion,
- the sidewall rubber portion including an axially outer layer and and an axially inner layer,
- the outer layer disposed along the axial outside of the tire and containing powder rubber,
- the inner layer disposed along the axial inside of the outer layer and containing no powder rubber,
- the thickness of the outer layer being 3 to 50% of the total thickness of the sidewall rubber portion, and
- the outer layer being composed of 100 parts by weight of a base rubber compound and 5 to 20 parts by weight of the powder rubber.

Preferably, the powder rubber has a maximum particle diameter of 30 to 80 mesh.

Therefore, the adhesiveness or tackiness of the raw outer layer is decreased by the powder rubber contained therein, and the above-mentioned problems can be solved.

DESCRIPTION OF THE PREFERRED EMBODIMENT(S)

Figure 1:
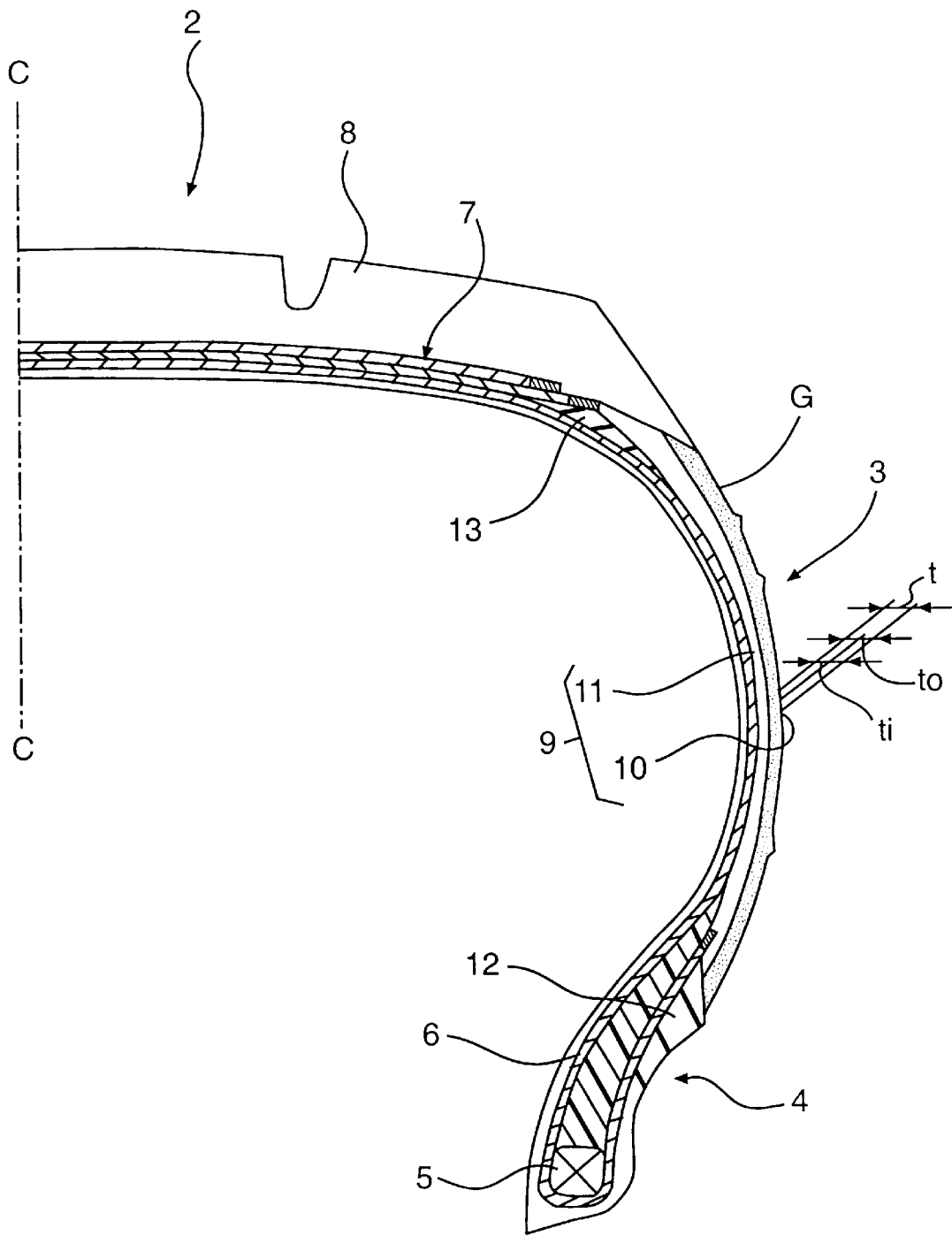
FIG. 1 is a cross sectional view of a pneumatic tire showing an embodiment of the present invention.

In FIG. 1, a pneumatic tire according to the present invention comprises, generally, a tread portion 2, a pair of axially spaced bead portions 4 each with a bead core 5 therein, a pair of sidewall portions 3, a carcass 6 extending between the bead portions 4, and a belt 7 disposed radially outside the carcass 6 and inside a tread rubber 8. In this example, the pneumatic tire is a radial tire for passenger cars.

The carcass 6 comprises at least one ply of cords arranged radially at an angle of from 90 to 75 degrees in (this embodiment, 90 degrees) with respect to the tire equator C, and extending between the bead portions 4 through the sidewall portions 3 and the tread portion. The at least one ply of cords are turned up around the bead cores 5 from the axial inside to the outside thereof to form two turned up portions and one main portion therebetween. For the carcass cords, preferably, organic fiber cords, e.g., polyester, nylon, rayon and the like, are used, but steel cords can be used.

On the outside of the carcass 6, a tread rubber portion 8 defining the tread portion 2, and a sidewall rubber portion 9 defining the sidewall portion 3 are disposed. Further, a clinch apex rubber 12 made of hard rubber defining the upper bead portion is disposed to reinforce the bead portion 4.

As shown in FIG. 1, the sidewall rubber portion 9 has a double layered structure including an outer layer 10 defining an outside sidewall portion and an inner layer 11 disposed inward of the outer layer 10.

The outer layer 10 contains powder rubber G, but the inner layer 11 does not contain powder rubber.

In this example, the tread rubber 8 does not contain powder rubber. However, it is possible for the tread rubber 8 to contain powder rubber.

For the inner layer 11, not only a special rubber compound but also a usual rubber compound can be used.

For the outer layer 10, usually the same rubber compound as the inner layer 11 issued except that powder rubber G is additionally added.

The powder rubber G is formed by powdering blocks or pieces of vulcanized rubber using a roll crusher, grinder and the like so as to pass through a sieve of 30 to 80 meshes per inch. Therefore, the maximum particle diameter of the powder rubber G is in the range of from 30 to 80 meshe. Thus, the larger the mesh number, the smaller the particle diameter. If the maximum particle diameter is less than 30 meshe, that is, if the particle diameter increases, the cut resistance of the sidewall portion 3 decrease. More preferably, the maximum particle diameter is in the range of from 40 to 80 meshe.

For the vulcanized rubber material, for example, used tires are recycled. That is, from used tires, the vulcanized rubber is separated so as not to include foreign objects such as steel cords, bead core wires and the like by means of freeze crushing or mechanical crushing.

The content of the powder rubber G is 5 to 20 (preferably, 5 to 15) parts by weight with respect to 100 parts by weight of the base rubber compound.

The outer layer 10 has a thickness (to) of from 3 to 50% of the total thickness (t) of the sidewall rubber portion 9. If the thickness (to) is more than 50%, the cut resistance of the sidewall portion 3 decreases, and the durability of the tire decreases. If the thickness (to) is less than 3%, it becomes difficult to fully prevent the occurrence of bare parts in the sidewall portion. More preferably, the thickness (to) is in the range of from 30 to 50% of the total thickness (t).

Figure 2:
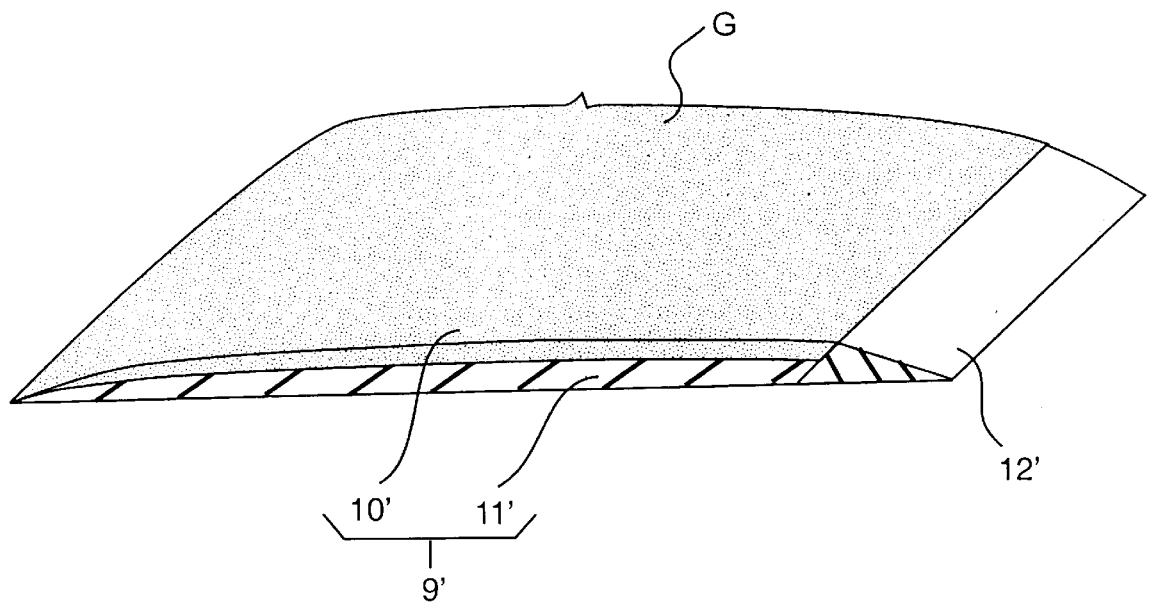
FIG. 2 is a perspective view of a raw sidewall rubber portion.

FIG. 2 shows a raw sidewall rubber portion segment 9' which is, in this example, assembled with a raw clinch apex rubber 12' to form a strip of raw rubber. Thus, it is possible to apply the raw sidewall rubber portion 9' and raw clinch apex rubber 12' at the same time.

The raw sidewall rubber portion 9' is composed of a raw outer layer 10' and a raw inner layer 11'. To form this raw rubber strip, the raw rubber compounds for the outer and inner layers 10 and 11 and the clinch apex rubber 12 are extruded separately or together and are united by their own adhesiveness.

Figure 3:
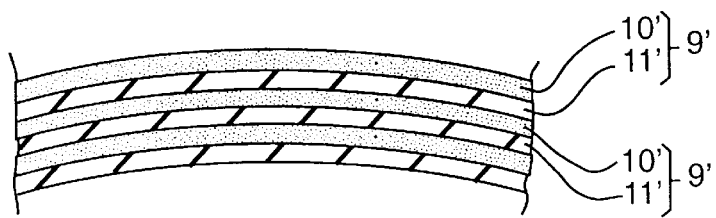
FIG. 3 is a partial cross sectional view of a roll of the raw sidewall rubber.
Figure 4:
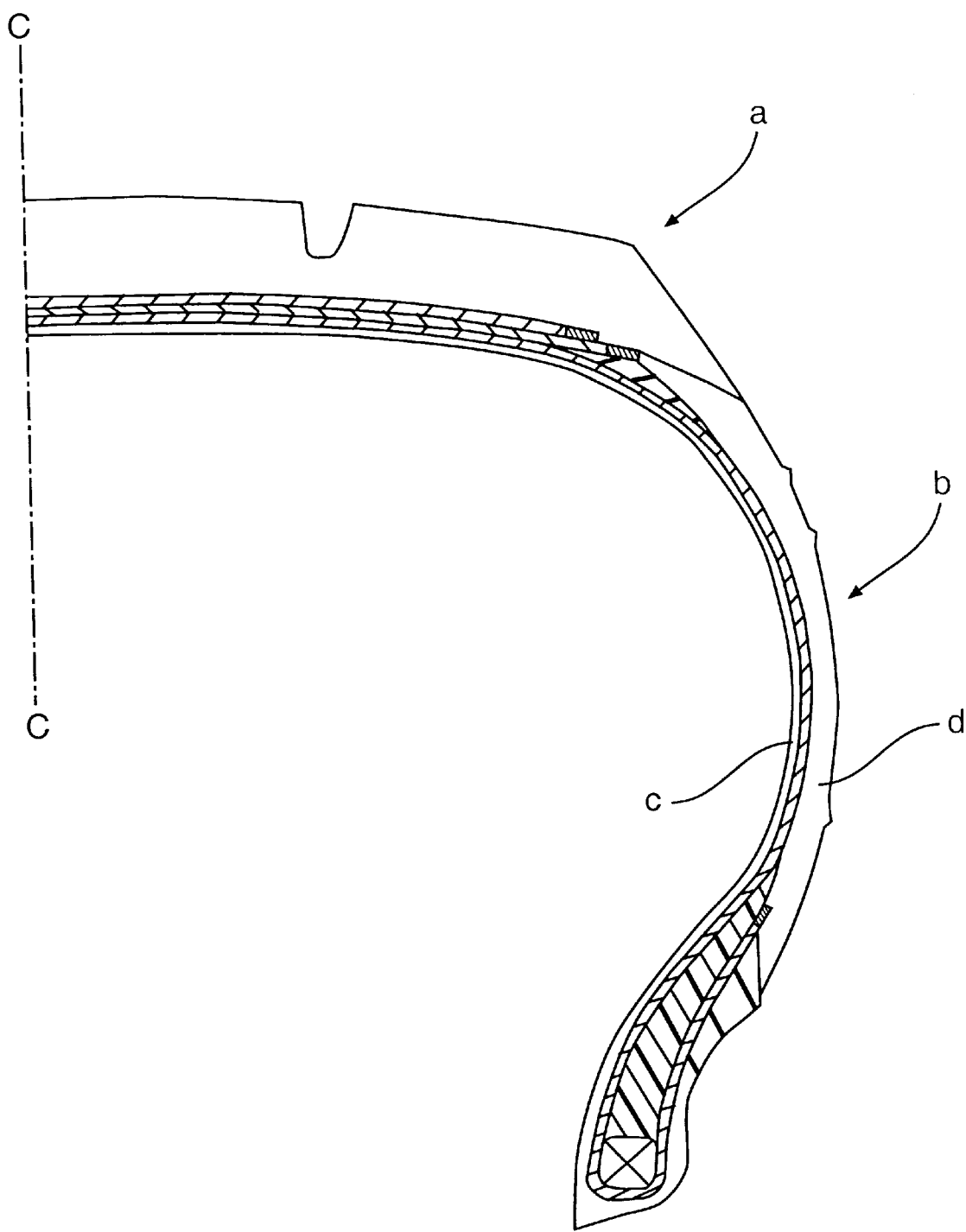
FIG. 4 is a cross sectional view of a pneumatic tire including a conventional sidewall rubber portion.
Figure 5:
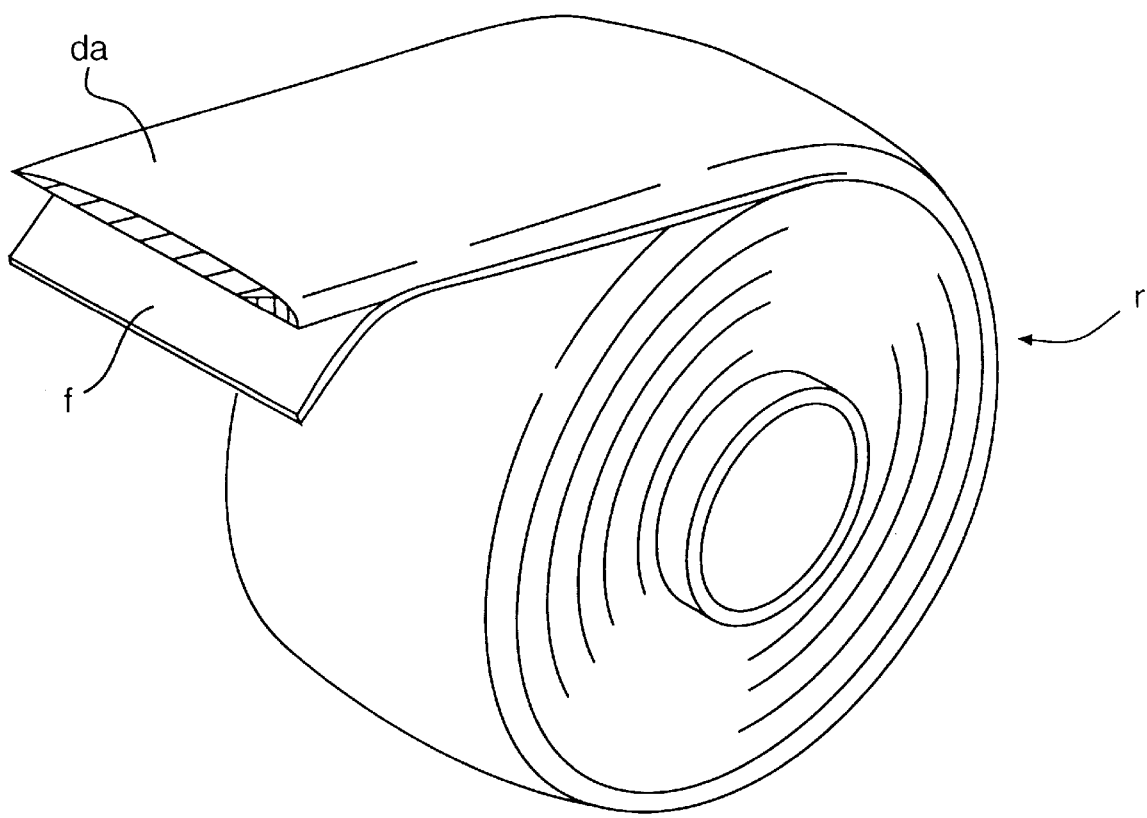
FIG. 5 is a perspective view showing a roll of the conventional sidewall rubber.

The adhesiveness of the raw outer layer 10' is decreased by the powder rubber G contained therein. Adhesion between the raw outer layer 10' and the raw inner layer 11' can therefore be prevented. Accordingly, it is possible to wind the raw rubber strip in a roll without needing any separator as shown in FIG. 3. The process (or steps) of removing the separator can be omitted to improve production efficiency.

Further, the adhesion between raw outer layer 10' and the vulcanizing mold can be decreased or prevented. Thus, the occurrence of air-filled spaces is prevented, thereby preventing the occurrence of sidewall rubber bare parts.

As the raw inner layer 11' does not contain the powder rubber, it's adhesiveness is maintained, and thus the adhesion of the sidewall rubber to the carcass 6 is not decreased.

If the content of the powder rubber G is less than 5 parts by weight, it's adhesiveness does not decrease, and thus it is necessary to provide a separator between the windings of the raw sidewall rubber 9'. If the content is more than 20 parts by weight, the cut resistance of the sidewall portion 3 of the finished tire decreases, and the durability greatly decreases.

[Comparison Test]

First, various raw sidewall rubber portions were formed, changing the particle diameter and content of the powder rubber and the thickness of the outer layer as shown in Table 1, and the adhesion between the windings of the sidewall rubber when wound without the separator was evaluated.

Next, using such raw sidewall rubber portions, test tires of size 185/70R14 were made under the same conditions and tested for the cut resistance of the sidewall portion and bare part of the sidewall rubber.

A) Cut resistance test

The test tire was provided in the surface of the sidewall portion with a 1 mm depth and 5 mm length cut extending along a radial direction. Then, the tire was run for 30000 km at a speed of 60 km/h using a test drum, and the growth of the cut was observed. The results are indicated in Table 1 by an index based on that the conventional tire is 100. The larger the mark, the better the cut resistance, and the passing mark is 75.

Rim size: 5.5JJ

Air pressure: 1.9 kgf/sq.cm

Tire load: 647 kg

B) Bare sidewall rubber test

The size and number of bare parts formed in the sidewall portion were evaluated. The results are indicated in Table 1 by an index based on that the conventional tire is 100. The smaller index is better.

TABLE 1

| Tire | Conv. | Ex. 1 | Ex. 2 | Ex. 3 | Ref. 1 | Ex. 4 | Ex. 5 |
|---|---|---|---|---|---|---|---|
| Thickness | | | | | | | |
| Inner layer ti (%) | 100 | 50 | 70 | 50 | 30 | 50 | 50 |
| Outer layer to (%) | — | 50 | 30 | 50 | 70 | 50 | 50 |
| Powder rubber | | | | | | | |
| Content *1 | — | 15 | 15 | 15 | 15 | 20 | 5 |
| Particle dia. *2 | | 30 | 30 | 20 | 30 | 30 | 30 |
| Cut resistance (index) | 100 | 100 | 100 | 80 | 70 | 75 | 90 |
| Rubber bare (index) | 100 | 50 | 50 | 50 | 50 | 50 | 80 |
| Adhesion of windings | occurred | non | non | non | non | non | *3 |

*1) Parts by weight
*2) The number of meshes of the sieve
*3) The windings were slightly adhered, but there is no problem in practice.

I claim:

1. A pneumatic tire comprising
    a carcass extending between bead portions through a tread portion and a pair of sidewall portions, and
    a sidewall rubber disposed axially outside the carcass in each sidewall portion,
    the sidewall rubber comprising an axially outer layer and an axially inner layer,
    the outer layer disposed along the outside of the tire and containing powdered vulcanized rubber,
    the inner layer disposed along the axially inside of the outer layer and containing no powdered vulcanized rubber,
    the thickness of the outer layer being 3 to 50% of the total thickness of the sidewall rubber, and
    the outer layer composed of 100 parts by weight of a base rubber compound and 5 to 20 parts by weight of the powdered vulcanized rubber.

2. A pneumatic tire according to claim 1, wherein the powdered vulcanized rubber has a particle diameter between 30 to 80 meshes per inch.

3. A method of manufacturing a pneumatic tire comprising the steps of
    forming a raw tire by applying a raw sidewall rubber onto a raw carcass, and
    putting the raw tire in a vulcanizing mold, wherein
        the raw sidewall rubber is wound in a roll,
        wherein the raw sidewall rubber has a double layered structure comprising:
            an outside layer for defining the outside of the tire sidewall portion, and
            an inside layer for forming the axially inside part of the tire sidewall portion,
            the outside layer being composed of 5 to 20 parts by weight of powdered vulcanized rubber and 100 parts by weight of a base rubber compound, and
            the inside layer containing no powdered vulcanized rubber.

4. The method according to claim 3, wherein said powdered vulcanized rubber is made by crushing vulcanized rubber blocks so as to pass through a sieve of between 30 to 80 meshes per an inch.

5. The method according to claim 4, wherein the maximum particle diameter of said powdered vulcanized rubber is 40 to 80 meshes.

6. A method of manufacturing a pneumatic tire comprising the steps of forming a raw tire by applying a raw sidewall rubber onto a raw carcass, and putting the raw tire in a vulcanizing mold, wherein the raw sidewall rubber has a double layered structure comprising an outside layer for defining the outside of the tire sidewall portion, and an inside layer for forming the axially inside part of the tire sidewall portion, the outside layer contains 5 to 20 parts by weight of powdered vulcanized rubber against 100 parts by weight of a base rubber compound but the inside layer contains no powdered vulcanized rubber so that the outside layer is less adhesive than the inside layer, and the raw sidewall rubber is wound in a roll without a sheet of separator between the windings.

7. The method according to claim 6, wherein said powdered vulcanized rubber is made by crushing vulcanized rubber blocks to pass through a sieve of between 30 to 80 meshes per an inch.

8. The method according to claim 7, wherein the maximum particle diameter of said powdered vulcanized rubber is 40 to 80 meshes.

\* \* \* \* \*